(12) United States Patent
Roy

(10) Patent No.: US 8,605,034 B1
(45) Date of Patent: Dec. 10, 2013

(54) MOTION-BASED PAGE SKIPPING FOR A MOBILE DEVICE

(75) Inventor: Lionel Roy, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 295 days.

(21) Appl. No.: 13/076,286

(22) Filed: Mar. 30, 2011

(51) Int. Cl.
G09G 5/00 (2006.01)
G06F 3/041 (2006.01)
H04M 1/00 (2006.01)
A63F 9/24 (2006.01)

(52) U.S. Cl.
USPC .............. 345/156; 345/173; 455/566; 463/42

(58) Field of Classification Search
USPC ............ 345/156–157, 173, 179, 901; 463/16, 463/20, 25, 42; 715/702, 776, 810, 835, 715/863; 455/566; 709/217; 707/E17.014; 705/3; 273/138.1, 139
See application file for complete search history.

(56) References Cited

U.S. PATENT DOCUMENTS

| | | | |
|---|---|---|---|
| 2003/0048305 | A1 | 3/2003 | Liang et al. |
| 2006/0017692 | A1* | 1/2006 | Wehrenberg et al. ......... 345/156 |
| 2007/0164993 | A1 | 7/2007 | Kao et al. |
| 2009/0033618 | A1* | 2/2009 | Norager ........................ 345/156 |
| 2010/0048302 | A1* | 2/2010 | Lutnick et al. ................. 463/42 |
| 2010/0175018 | A1 | 7/2010 | Petschnigg et al. |
| 2011/0039602 | A1* | 2/2011 | Mcnamara et al. ........... 455/566 |
| 2011/0050592 | A1 | 3/2011 | Kim et al. |

OTHER PUBLICATIONS

International Search Report for PCT Application No. PCT/US2011/031316 issued on Mar. 20, 2012, 3 pages.

* cited by examiner

*Primary Examiner* — Quan-Zhen Wang
*Assistant Examiner* — Michael J Eurice
(74) *Attorney, Agent, or Firm* — Osha Liang LLP

(57) ABSTRACT

The invention relates to a system for skipping a plurality of pages displayed on a mobile device. The system includes a computer processor, an accelerometer module, a calculating module, and a page-skipping engine, which are all operatively connected. The accelerometer module executes on the computer processor and is configured to detect, using an accelerometer, a movement of the mobile device, wherein the movement comprises a magnitude; determine that the mobile device is oriented for skipping the plurality of pages; and determine that the movement triggers skipping the plurality of pages. The calculating module executes on the computer processor and is configured to calculate, based on the magnitude of the movement and a plurality of settings, the plurality of pages to skip. The page-skipping engine executes on the computer processor and is configured to display a target page on the mobile device.

15 Claims, 6 Drawing Sheets

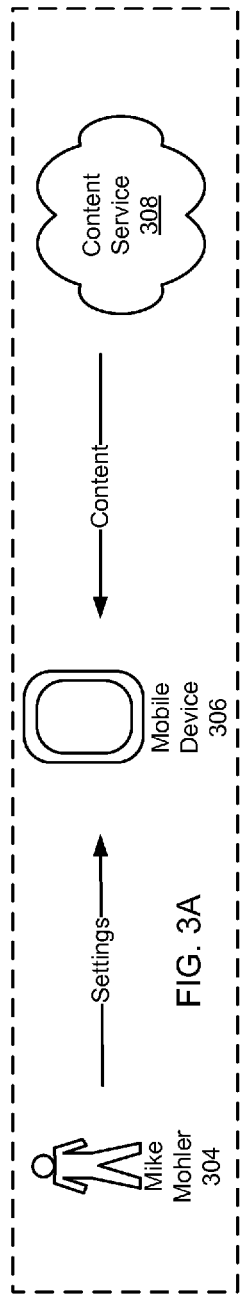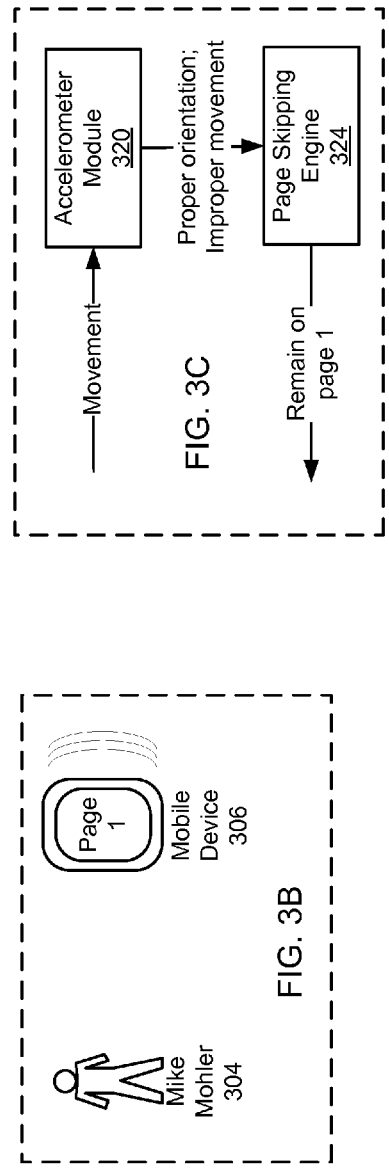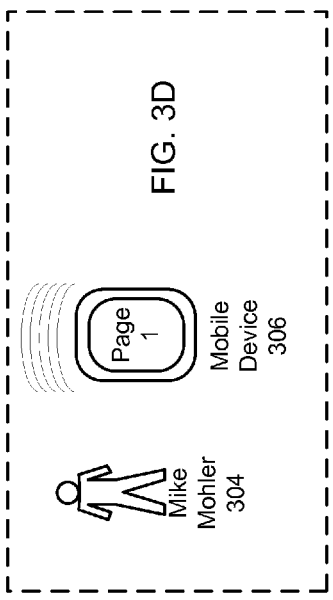

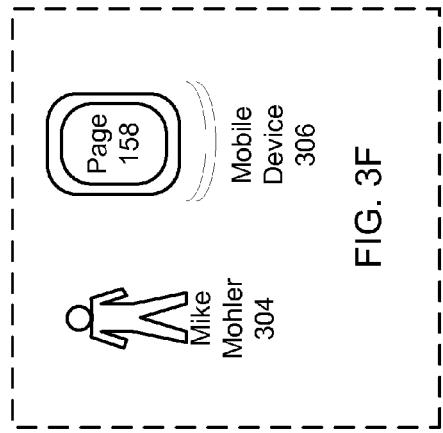
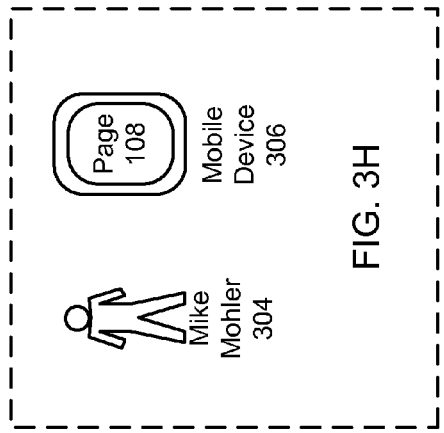
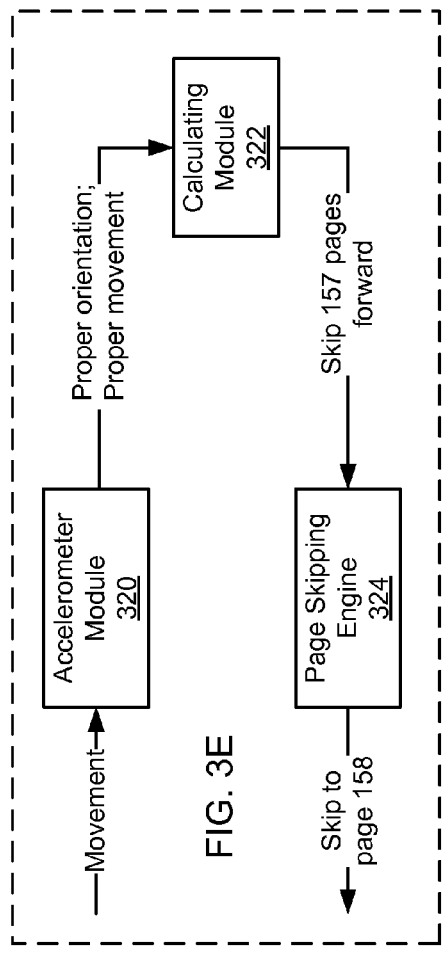
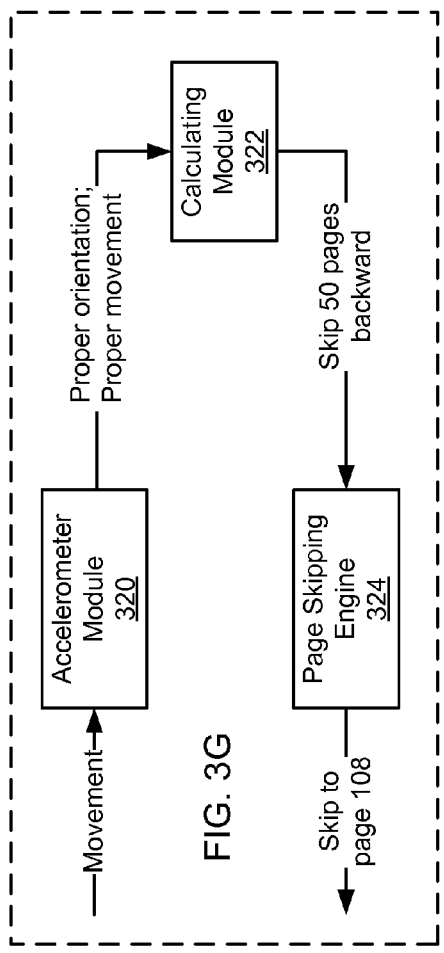

MOTION-BASED PAGE SKIPPING FOR A MOBILE DEVICE

BACKGROUND

A number of applications may be executed on a mobile device. Some of these applications may include content that requires viewing multiple pages on a display screen of the mobile devices. At times, a user of a user application displaying multiple pages may wish to change the display on the mobile device from one page to a different, non-consecutive page of the user application. As the use of mobile devices increases, multi-page content displayed on mobile devices is more prevalent. Further, as users rely on mobile devices to perform more functions that the user is accustomed to performing in paper form or on a traditional computer with traditional interfaces (e.g., large display monitor, keyboard, mouse), the users may need more navigational functionality when using multi-page content on mobile devices.

SUMMARY

In general, in one aspect, the invention relates to a system for skipping a plurality of pages displayed on a mobile device. The system includes a computer processor, an accelerometer module, a calculating module, and a page-skipping engine, which are all operatively connected. The accelerometer module executes on the computer processor and is configured to: (1) detect, using an accelerometer, a movement of the mobile device, wherein the movement comprises a magnitude, (2) determine, using the accelerometer, that the mobile device is oriented for skipping the plurality of pages, and (3) determine, using the accelerometer, that the movement triggers skipping the plurality of pages. The calculating module executes on the computer processor and is configured to calculate, based on the magnitude of the movement and a plurality of settings, the plurality of pages to skip. The page-skipping engine executes on the computer processor and is configured to display, based on the plurality of pages calculated by the calculating module, a target page on the mobile device.

In general, in one aspect, the invention relates to a method for skipping a plurality of pages displayed on a mobile device. The method steps include (1) detecting, using a computer processor, a movement of the mobile device displaying a current page, wherein the movement comprises a magnitude, (2) determining, using the computer processor, that the mobile device is oriented for skipping the plurality of pages, (3) determining, using the computer processor and based on determining that the mobile device is oriented for skipping the plurality of pages, that the movement triggers page skipping on the mobile device, (4) calculating, using the computer processor and based on determining that the movement triggers page skipping, the plurality of pages to skip based on the magnitude of the movement and a plurality of settings, and (5) displaying, using the computer processor and based on the plurality of pages to skip from the current page, a target page on the mobile device.

In general, in one aspect, the invention relates to a computer readable medium comprising computer readable program code embodied therein for performing a method for skipping a plurality of pages displayed on a mobile device. The method steps include (1) detecting a movement of the mobile device displaying a current page, wherein the movement comprises a magnitude, (2) determining that the mobile device is oriented for skipping the plurality of pages, (3) determining, based on determining that the mobile device is oriented for skipping the plurality of pages, that the movement triggers page skipping on the mobile device, (4) calculating, based on determining that the movement triggers page skipping, the plurality of pages to skip based on the magnitude of the movement and a plurality of settings, and (5) displaying, based on the plurality of pages to skip from the current page, a target page on the mobile device.

Other aspects of the invention will be apparent from the following description and the appended claims.

BRIEF DESCRIPTION OF DRAWINGS

FIGS. 3A through 3H show an example in accordance with one or more embodiments of the invention.

DETAILED DESCRIPTION

Figure 1:
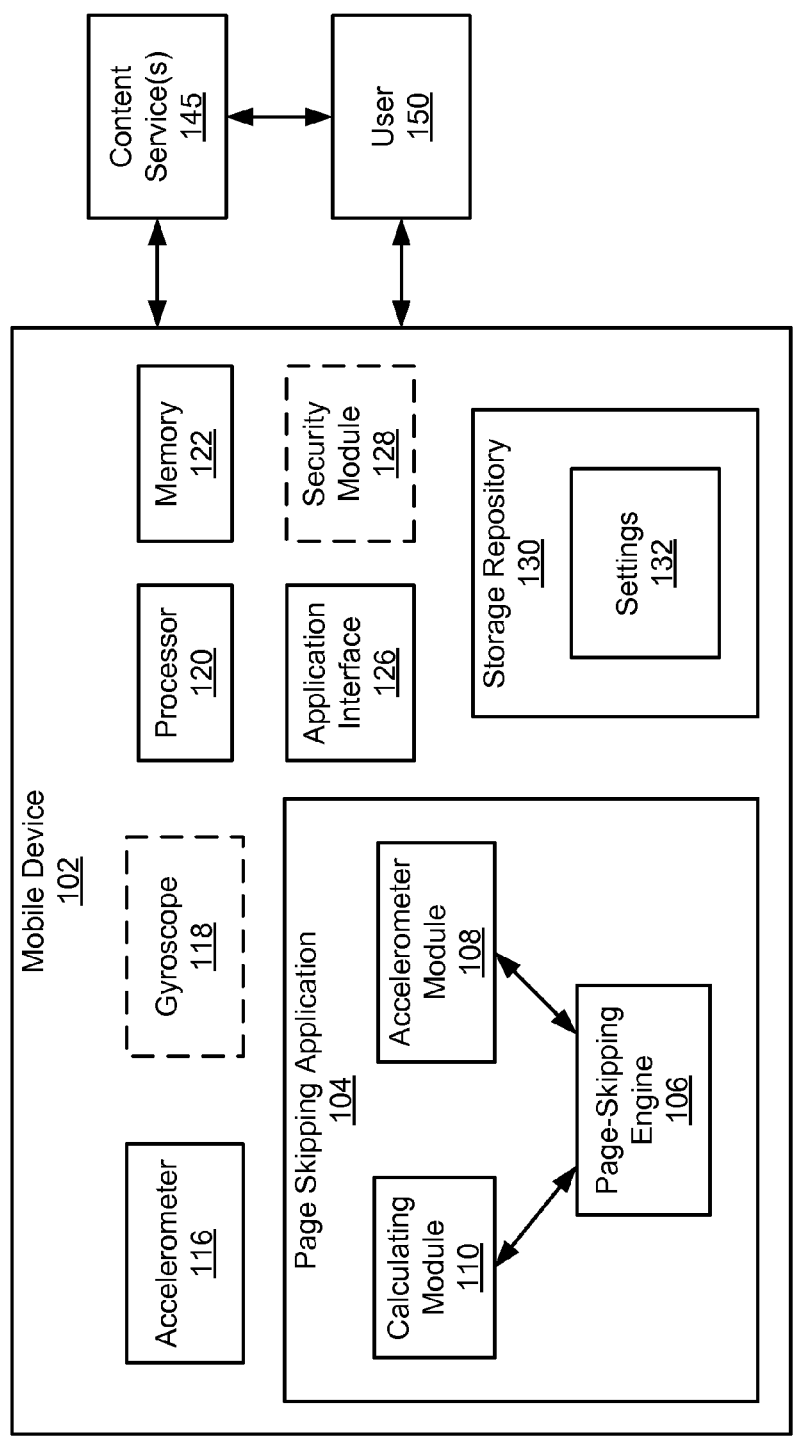
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention involve skipping a number of pages displayed on a mobile device. Specifically, one or more embodiments of the invention involve processing a movement of the mobile device, displaying a user application with content including a number of pages, by determining that the mobile device is properly oriented and that the movement triggers a page skipping feature. If the mobile device is properly oriented and if the movement triggers a page skipping feature, then a calculation is made to determine the number of pages to skip on the mobile device. Finally, a page corresponding to the number of pages to skip is displayed on the mobile device.

FIG. 1 shows a diagram of a system in accordance with one or more embodiments of the invention. The system includes a mobile device (102), a content service (145), and a user (150). The mobile device (102) includes a page skipping application (104), an accelerometer (116), a storage repository (130), a processor (120), memory (122), an application interface (126), and, optionally, a gyroscope (118) and a security module (128). The page skipping application (104) includes a page skipping engine (106), an accelerometer module (108), and a calculating module (110). The storage repository (130) includes settings (132). Each of these components is described below. Embodiments of the invention are not limited to the configuration shown in FIG. 1 and discussed herein.

In one or more embodiments of the invention, the mobile device (102) is implemented according to a client-server topology. In addition, the mobile device (102) may be accessible from other machines using one or more application programming interfaces and/or user interfaces (not shown). In one or more embodiments of the invention, the mobile device (102) may be accessible over a network connection (not shown), such as the Internet, by a content service (145) and/or the user (150). Further, information and/or services provided by the mobile device (102) may also be stored and accessed over the network connection.

Alternatively or additionally, in one or more embodiments of the invention, the mobile device (102) may be a local mobile device of the user (150). In such embodiments, the mobile device (102) may, optionally, not be implemented using a client-server topology. For example, the mobile device (102) may correspond to a tablet computer, smart phone, personal digital assistant, or another type of mobile computing device.

In one or more embodiments of the invention, the user (150) may interact with the mobile device (102). For example, the user (150) may launch one or more applications that are displayed on the mobile device, enable/disable the page skipping function, provide settings, and skip pages of a user application displayed on the mobile device (102). The user (150) may be any individual using the mobile device (102). The user (150) may send information (e.g., user preferences, settings, a user application) to the mobile device (102) in a number of manners (e.g., modes of communication), including but not limited to a user interface (not shown) of the mobile device (102), email, short message service, over the Internet, some other suitable mode for sending information, or any combination thereof. Further, the user (150) may receive information and/or a request for information (e.g., settings) from the mobile device (102). The information and/or request for information may be delivered automatically (e.g., according to a default setting, a consumer preference, an occurrence of an event) or on demand, for example, in response to information sent by the user to the mobile device (102). The mobile device (102) may interact with the user (150) in the same manner that the user (150) interacts with the mobile device (102), or using different modes of communication. The user (150) may use a user system (not shown) (discussed below) to interact with the mobile device (102) using software (not shown) in accordance with one or more embodiments of the invention.

In one or more embodiments of the invention, the user (150) interacts with one or more content services (145). Specifically, the user (150) may retrieve one or more applications used on the mobile device (102) from the content service (145). A user application may be any content, having any number of pages, displayed on the mobile device (102). Examples of a user application may include, but are not limited to, an electronic book reader, an email client, a spreadsheet viewer, and a financial application. A content service (145) may be any entity that provides content (e.g., a user application) used by the mobile device (102). Examples of a content service (145) include, but are not limited to, the Amazon.com® website and the Handango® website. (Amazon.com® is a registered service mark of Amazon Technologies, Inc., of Reno, Nev.; Handango® is a registered trademark and service mark of Handango, Inc. of Hurst, Tex.) For example, a content service (145) may provide electronic books that the user (150) may download, either directly from the content service (145) or using another source (e.g., a user system), to the mobile device (102). Further, the user (150) may send information (e.g., payment information, user preferences, feedback) to a content service (145).

In one or more embodiments of the invention, the user (150) sends information to a content service (145) in a number of manners (e.g., modes of communication), including but not limited to mail, a telephone, email, fax, short message service, over the Internet, some other suitable mode for sending information, or any combination thereof. Further, the user (150) may receive information (e.g., an invoice, a confirmation of a purchase) from a content service (145). The information may be delivered automatically (e.g., according to a default setting, a consumer preference, an occurrence of an event) or on demand, for example, in response to a request from a content service (145). The content service (145) may interact with the user (150) in the same manner that the user (150) interacts with the content service (145), or using different modes of communication. The user (150) may use a user system (not shown) (discussed below) to interact with a content service (145) using software (not shown) in accordance with one or more embodiments of the invention.

In one or more embodiments of the invention, each content service (145) sends information (e.g., multi-page content) to, and receives information (e.g., a request for multi-page content) from, the mobile device (102). The information may be delivered automatically (e.g., according to a default setting, a marketing entity preference, an occurrence of an event) or on demand, as from a request made by the mobile device (102). Each content service (145) may interact with the mobile device (102) in the same mode of communication that the mobile device (102) interacts with a content service (145), or using different modes of communication. In one or more embodiments of the invention, each content service (145) uses a content service system (not shown) to interact with the mobile device (102) using content service software (not shown) (discussed below).

Continuing with FIG. 1, the mobile device (102) is configured to interact with the user (150) and each content service (145) using an application interface (126) in accordance with one or more embodiments of the invention. Specifically, the application interface (126) of the mobile device (102) is configured to receive input from and send output to the user (150) and/or a content service (145). The user (150) and/or each content service (145) may include an interface to receive data from and send data to the mobile device (102). Examples of an interface may include, but are not limited to, a graphical user interface, a user application programming interface, a keyboard, a monitor, a mouse, a web service, a data protocol adapter, some other hardware and/or software, or any suitable combination thereof.

In one or more embodiments of the invention, the information received by the application interface (126) includes, but is not limited to, a user application with multi-page support, multi-page content, user preferences, settings, a confirmation, and feedback. The information sent by the application interface (126) may include, but is not limited to, a request for a user application with multi-page support, a request for multi-page content, payment information, and a request for settings. The information sent by the application interface (126) may specify, but is not limited to, a user, a content service, a Uniform Resource Identifier (URI) (e.g., a Uniform Resource Locator (URL), a web address, etc.), some other software or source of information, or any suitable combination thereof.

In one or more embodiments of the invention, the information (i.e., data) transferred among the application interface (126), the user (150), and/or each content service (145) corresponds to metadata associated with, for example, a user application with multi-page support, multi-page content, user preferences, payment information, a request, settings, a confirmation, and/or feedback. In this case, the metadata may describe the data specified in the information (i.e., the metadata may provide context for the specified data). In one or more embodiments of the invention, the mobile device (102)

is configured to support various data formats provided by the user (150) and/or each content service (145).

Continuing with FIG. 1, the mobile device (102) is configured to retrieve and store settings (132). More specifically, the mobile device (102) may be configured to use the page skipping engine (106) to retrieve and store settings (132) in the storage repository (130) in accordance with one or more embodiments of the invention. In one or more embodiments of the invention, settings include one or more parameters that define the operation of the page skipping application (104). For example, a setting may be that the page skipping feature is enabled when the mobile device is moved and/or rotated from side to side. As another example, a setting may be that the mobile device must be held vertically to be properly oriented for the page skipping feature. As a further example, a different movement or set of movements may cause the page skipping feature to skip to the first or last page of the user application. The settings (132) stored in the storage repository (130) may be associated with a page skipping feature involving the user or a number of users.

Continuing with FIG. 1, the storage repository (130) is a persistent storage device (or set of devices) that stores software and data used to skip a number of pages of a user application. The storage repository (130) may also store one or more applications with multi-page support. In one or more embodiments of the invention, the storage repository (130) is configured to store the settings (132) in accordance with one or more embodiments of the invention. Examples of a storage repository (130) include, but are not limited to, a database (or a number of databases), a file system, a hard drive, some other form of data storage, or any suitable combination thereof. The storage repository (130) may be located on multiple physical machines, each storing all or a portion of the settings (132). Each storage unit or device may be physically located in the same (e.g., on the mobile device (102)) or different geographic location.

The storage repository (130) may be operatively connected to the page skipping application (104). In one or more embodiments of the invention, the page skipping application (104) includes functionality to skip pages of a user application displayed on the mobile device (102). More specifically, the page skipping application (104) may be configured to receive, for example, a user application with multi-page support, multi-page content, user preferences, and settings from the application interface (126) and store the settings in the storage repository (130). The functions of the page skipping application (104) may be performed on a single computing device or on multiple computing devices. When the functions of the page skipping application (104) are performed on multiple computing devices, a number of configurations and/or frameworks may be used. The configurations and/or software frameworks may be designed to work with multiple data nodes and large quantities of data. One or more calculations performed by one or more components of the page skipping application (104) may be performed on multiple machines operating in parallel, where the results from each machine may be combined to generate a result to the one or more calculations. In one or more embodiments of the invention, the page skipping application (104) may be implemented in the operating system of the mobile device (102) (support system-wide page skipping for multiple user applications) and/or may be embedded in one or more user applications.

In one or more embodiments of the invention, the page skipping engine (106) of the page skipping application (104) is configured to coordinate the accelerometer module (108) and the calculating module (110). Specifically, the page skipping engine (106) may be configured to coordinate the transfer of, for example, a user application with multi-page support, multi-page content, user preferences, settings, requests, and payment information between the application interface (126), the storage repository (130), and the other components of the page skipping application (104).

Further, the page skipping engine (106) may be configured to retrieve the settings (132) from, and send settings to, the storage repository (130) for use by the page skipping engine (106) or by other components of the page skipping application (104). The page skipping engine (106) may also be configured to retrieve settings (132) from the storage repository (130) to be sent to the user (150) and/or one or more content services (145).

Continuing with FIG. 1, the page skipping engine (106) is configured to receive notification of a user application displayed on the mobile device (102). In one or more embodiments of the invention, a user application is a software program with multi-page support displayed on the mobile device (102). A page may be any division or portion of the content displayed in the user application, where the collection of pages displayed in a user application creates the entire content displayed in the user application. A page may include, but is not limited to, a page (as in a page of a book), a tab (as in a spreadsheet), a section, a chapter, and a sheet.

In one or more embodiments of the invention, the page skipping engine (106) is further configured to determine whether the user application displayed on the mobile device (102) can use the page skipping feature of the page skipping application (104). The page skipping engine (106) may make such a determination by evaluating the user application. For example, the page skipping engine (106) may determine that the user application supports multiple pages, and so the user application can use the page skipping feature of the page skipping application (104). The page skipping engine (106) may also receive information about the user application displayed on the mobile device (102). Examples of such information may include, but are not limited to, a current page displayed in the user application and a total number of pages loaded in the user application.

In one or more embodiments of the invention, the page skipping engine (106) is further configured to process a movement of the mobile device (102). Specifically, the page skipping engine (106) may be configured to use information provided by the accelerometer module (108) and the calculating module (110) to determine and present, based on skipping a number of pages from a current page, a target page of the user application on the mobile device (102). For example, if a current page is page 2 of a 200 page document displayed in a user application, and if the number of pages to skip (as calculated by the calculating module (110), described below) is 155, then the page skipping engine (106) determines that the target page is page 157 of the document. As a result, the page skipping engine (106) sends a notification to the user application to display page 157 of the document on the mobile device (102).

The page skipping engine (106) may also be configured to determine whether the user application has been exited in embodiments of the invention. Specifically, the page skipping engine (106) may be configured to determine whether the user application is active on the mobile device (102). The page skipping engine (106) may also be configured to determine whether the page skipping feature has been disabled, as from a change in the settings.

Continuing with FIG. 1, the accelerometer module (108) is configured to detect a movement of the mobile device (102). The accelerometer module (108) may use an accelerometer (116) and/or a gyroscope (118) to detect the movement of the mobile device (102). In one or more embodiments of the invention, the accelerometer (116) is one or more devices (real or virtual) that measure the acceleration (and in some cases the orientation) of the mobile device (102). The optional gyroscope (118) may be one or more devices that measure the orientation of the mobile device (102). The accelerometer (116) and/or gyroscope (118) may be part of the accelerometer module (108). Alternatively, the accelerometer (116) and/or gyroscope (118) may be located on a different portion of the mobile device (102). Devices (e.g., accelerometer (116), gyroscope (118)) used to measure acceleration and/or orientation are known to those skilled in the art.

In one or more embodiments of the invention, the orientation of the mobile device (102) is a description of how the mobile device (102) is placed at a point (i.e., location) in space. The orientation of the mobile device (102) is made with reference to one or more locations on the mobile device (102). For example, the mobile device (102) may have a top, a bottom, a front, a back, a left side, a right side, a number of corners, and a number of sides. Orientation and/or movement of the mobile device (102) may be measured at one or more of such locations on the mobile device (102). For example, a movement of the mobile device (102) may be made such that the middle (horizontally) of the mobile device merely rotates while the top and bottom of the mobile device accelerate in opposite directions (i.e., the user holds the middle of the mobile device, one hand on each side, and jerks the top portion of the mobile device downward (and the bottom portion upward) in a rotational motion).

The orientation of the mobile device (102), as measured by the accelerometer (116) and/or the gyroscope (118), may be measured before, during, and/or after a movement of the mobile device (102). For example, the orientation of the mobile device (102) may be measured before a movement to determine that the mobile device (102) is properly oriented for skipping pages (i.e., to use the page skipping feature). The orientation of the mobile device (102) may be used in conjunction with the settings to enable the page skipping feature. For example, the settings may require that the mobile device (102) is oriented within +/−30° of horizontal to enable the page skipping feature.

In one or more embodiments of the invention, the accelerometer module (108) is configured to determine, using the accelerometer (116) and/or gyroscope (118), that the orientation of the mobile device (102) triggers the page skipping feature. For example, the accelerometer module (108) may determine that the mobile device (102), when oriented in a horizontal position, is oriented to enable the page skipping feature.

The acceleration of the mobile device (102), as measured by the accelerometer (116), may be a maximum acceleration at any location on the mobile device (102) during a movement, an average acceleration at one location on the mobile device (102) during a movement, an average acceleration at all locations on the mobile device (102) during a movement, or some other acceleration associated with a movement of the mobile device (102). The acceleration of the mobile device (102) may be measured regardless of the orientation of the mobile device (102). Further, the acceleration of the mobile device (102) may include a magnitude and a direction. The magnitude may be measured on a scale (e.g., 5 out of 10), as a percentage (e.g., 20%), or using some other suitable measure of the magnitude of the movement. The direction may be one of a pair of designations (e.g., back/forward, positive/negative) to indicate whether the target page is prior to or after the current page. The direction of the acceleration, in some cases combined with the settings, may determine whether the acceleration is positive or negative.

In one or more embodiments of the invention, the accelerometer module (108) determines, using the accelerometer (116), that the movement of the mobile device (102) triggers the page skipping feature. For example, the accelerometer module (108) may determine that a slow tilt of the mobile device (102) is insufficient to trigger the page skipping feature. As another example, the accelerometer module (108) may determine that a quick, jerking motion of the mobile device (102), tilting the top portion of the mobile device downward, is sufficient to trigger the page skipping feature. The accelerator module (108) may also determine the magnitude and/or direction of the movement.

In one or more embodiments of the invention, the settings are used by the accelerometer module (108) to determine whether the movement triggers the page skipping feature. For example, a setting may require that the accelerometer (118) detect a minimum acceleration before the page skipping feature is triggered. A movement of the mobile device (102) that fails to meet the minimum acceleration requirement of the settings will result in the current page continuing to be displayed on the mobile device (102).

Continuing with FIG. 1, the calculating module (110) is configured to calculate the number of pages to skip in accordance with one or more embodiments of the invention. The calculating module (110) may receive the magnitude and direction of the movement, as determined by the accelerometer module (108). The calculating module (110) may use the magnitude and direction of the movement, as well as the settings, to calculate the number of pages to skip. For example, the magnitude may be 8 out of 10, the direction may be forward, and the settings may require that the magnitude of the movement be directly and linearly proportional to the total number of pages in the user application, up to the number of pages between the last page and the current page of the user application. As such, when the current page is 1 and the total number of pages in the user application is 100, the calculating module (110) calculates that the number of pages to skip as a result of the movement to be 80.

Continuing with FIG. 1, the processor (120) within the mobile device (102) is configured to execute software in accordance with one or more embodiments of the invention. Specifically, the processor (120) may be configured to execute instructions for the mobile device (102) or any of the engines, modules, and repositories described above and shown in FIG. 1, as well as software used by the user (150) and/or one or more content services (145). The processor (120) may be an integrated circuit, a central processing unit, a multi-core processing chip, a multi-chip module including multiple multi-core processing chips, or other hardware processor. The processor (120) may be known by other names, including but not limited to a computer processor, a microprocessor, a hardware processor, and a multi-core processor. In one or more embodiments of the invention, the processor (120) is configured to execute software instructions stored in memory (122). The memory (122) may include one or more cache memories, main memory, and/or any other suitable type of memory. The memory (122) may be discretely located on the mobile device (102) relative to the processor (120). In certain configurations, the memory (122) may also be integrated with the processor (120).

Optionally, in one or more embodiments of the invention, the security module (128) is configured to secure interactions between the mobile device (102) and the user (150) and/or a content service (145). More specifically, the security module (128) may be configured to authenticate communication from software based on security keys verifying the identity of the source of the communication. For example, user software may be associated with a security key enabling the user software to interact with the mobile device (102). Further, the security module (128) may be configured to restrict requests for information (e.g., activation of a user application, settings), as well as access to information. For example, the user software may be restricted to only access multi-page content purchased by a specific user. Further, the user software may be restricted to provide only particular settings associated with a user.

As discussed above, the user and content service may use a user system and content service system, respectively. One or more of the user system and content service system may be, or may contain a form of, an Internet-based or an intranet-based mobile computer (e.g., laptop computer) that is capable of communicating with the user software. A mobile computer may include any type of computing device and/or communication device, including but not limited to mobile device (102). Examples of the user system and content service system may include, but are not limited to, a desktop computer with Internet or intranet access, a laptop computer with Internet or intranet access, a smart phone, a server, a server farm, and a personal digital assistant (PDA). The user system and/or content service system may correspond to a mobile computer as described below with regard to FIG. 4.

Further, as discussed above, the user system and/or content service system may each have corresponding software (e.g., user software and content service software, respectively). The user software and content service software, may execute on a separate device (e.g., a server, mainframe, desktop personal computer (PC), laptop, personal desktop assistant (PDA), television, cable box, satellite box, kiosk, telephone, mobile phone, or other computing devices) from the mobile device (102), the user (150) and/or the one or more content services (145), and may be coupled by a network (e.g., Internet, Intranet, Extranet, Local Area Network (LAN), Wide Area Network (WAN), or other network communication methods), with wire and/or wireless segments. The user software may also be part of, or operate separately but in conjunction with, the mobile device (102) and/or the one or more content services (145).

Figure 2A:
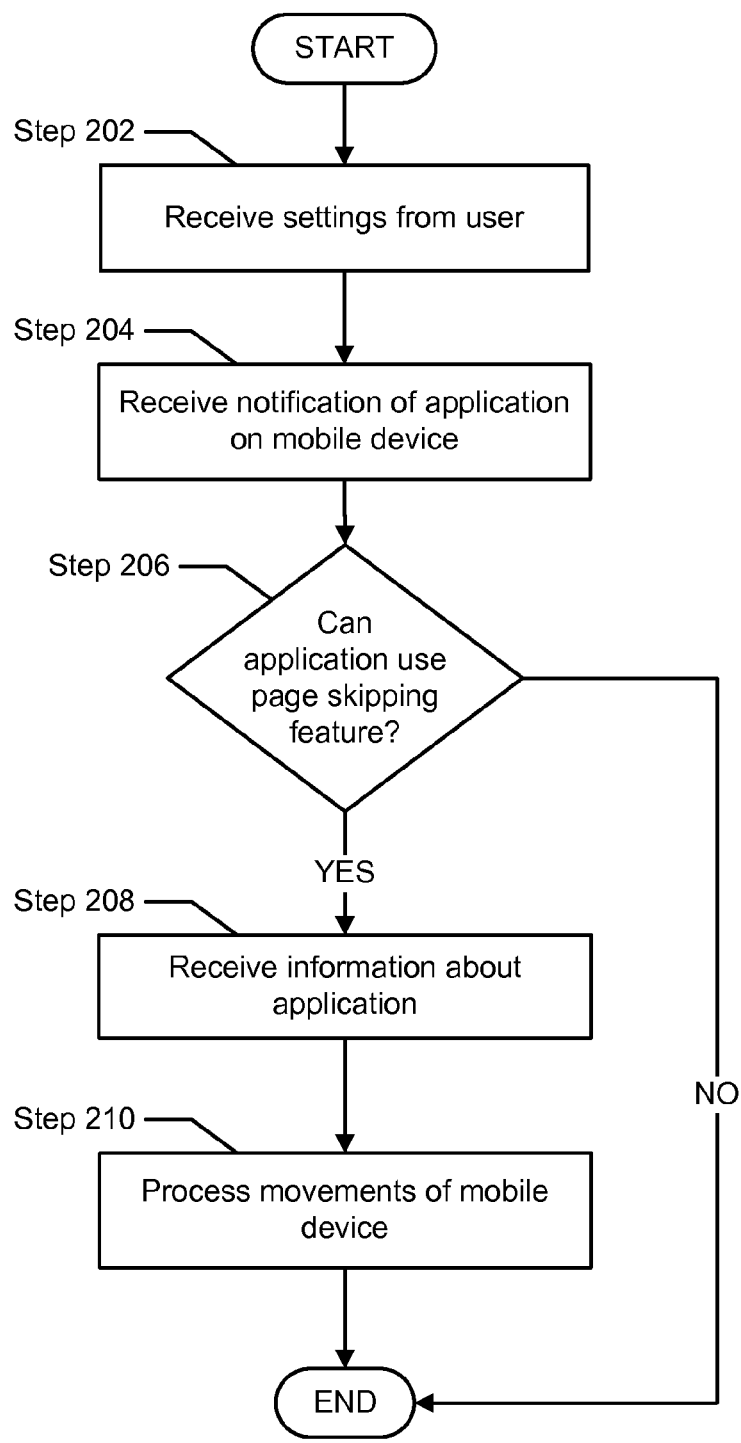
FIGS. 2A and 2B each show a flowchart of a method in accordance with one or more embodiments of the invention.
Figure 2B:
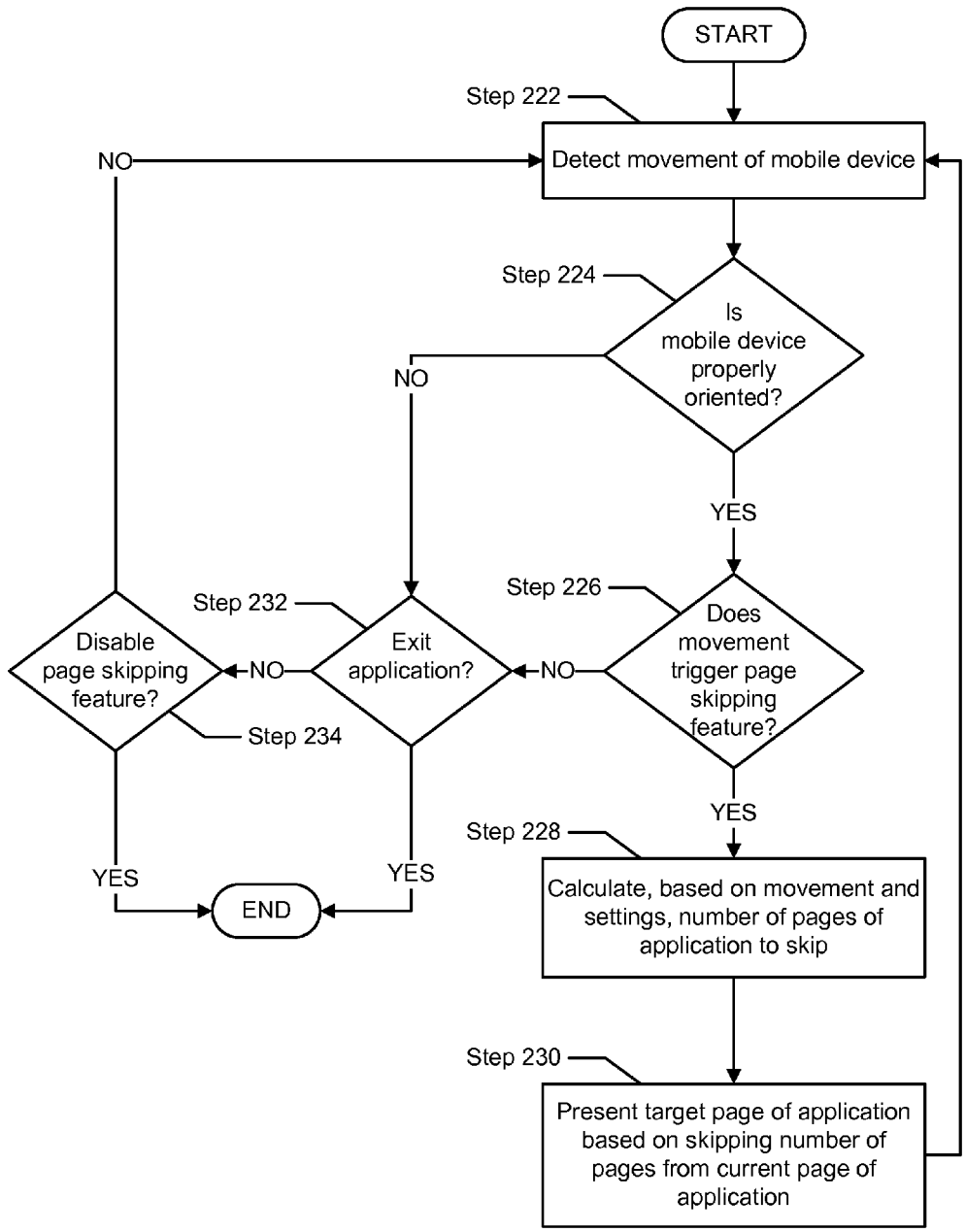

FIGS. 2A and 2B show flowcharts of a method for skipping pages displayed on a mobile device in accordance with one or more embodiments of the invention. While the various steps in these flowcharts are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIGS. 2A and 2B, may be included in performing this method. Accordingly, the specific arrangement of steps shown in FIGS. 2A and 2B should not be construed as limiting the scope of the invention.

Referring to FIG. 2A, in Step 202, settings are received. The settings may be received from a user, and/or some or all of the settings may be set by default. The settings may be received before and/or while the user application is displaying the pages of content on the mobile device. The settings may be any one or a combination of settings defined above with respect to FIG. 1. In one or more embodiments of the invention, a particular computing device, as described, for example, in FIG. 4 below, is used to receive the settings from the user.

In Step 204, a notification of the execution of the user application on the mobile device is received. In one or more embodiments of the invention, the notification is received when the user application is initiated by the user on the mobile device. In one or more embodiments of the invention, a particular computing device, as described, for example, in FIG. 4 below, is used to receive the notification of the user application on the mobile device.

In Step 206, a determination is made as to whether the user application can use the page skipping feature. In one or more embodiments of the invention, the user application is configured to use the page skipping feature when the user application is displaying content with multiple pages, tabs, sections, or other suitable division of portions of the user application. The determination as to whether the user application can use the page skipping feature may rely, at least in part, on the settings. For example, the setting may require that the page skipping feature only apply to a user application displaying at least 15 pages of content. In such a case, if a user application is displaying 20 pages, then the user application can use the page skipping feature. In one or more embodiments of the invention, a particular computing device, as described, for example, in FIG. 4 below, is used to determine whether the user application can use the page skipping feature. If the user application can use the page skipping feature, then the process proceeds to Step 208. If the user application cannot use the page skipping feature, then the process ends.

In Step 208, information about the user application is received. In one or more embodiments of the invention, information is any data about the user application that is needed for the page skipping feature. Examples of information may include, but are not limited to, a total number of pages of the user application and a current page of the user application displayed on the mobile device. In one or more embodiments of the invention, a particular computing device, as described, for example, in FIG. 4 below, is used to receive the information about the user application.

In Step 210, a movement of the mobile device is processed. In one or more embodiments of the invention, the movement may be any movement or combination of movements of the mobile device. For example, the mobile device may be lifted, bumped, turned, tilted, rotated, flipped, jerked, or moved in any other manner. Further, the movement may be in any direction in three-dimensional space. Details of how the movement of the mobile device is processed are described below with respect to FIG. 2B. In one or more embodiments of the invention, a particular computing device, as described, for example, in FIG. 4 below, is used to process the movement of the mobile device. After Step 210 is completed, the process ends.

Referring to FIG. 2B, in Step 222, movement of the mobile device is detected. The movement of the mobile device may be any movement as described above with respect to Step 210 of FIG. 2A. Specifically, the movement may be detected using one or more instruments located on the mobile device. Examples of such instruments may include, but are not limited to, an accelerometer, a gyroscope, and a compass. In one or more embodiments of the invention, a particular computing device, as described, for example, in FIG. 4 below, is used to detect the movement of the mobile device.

In Step 224, a determination is made as to whether the mobile device is properly oriented. In one or more embodiments, proper orientation of the mobile device enables the page skipping feature. Proper orientation of the mobile device may be associated with one or more settings, as described above with respect to FIG. 2A. For example, a setting may specify the one or more ways that the mobile device must be oriented (e.g., horizontal +/−30°) for a movement to trigger the page skipping feature. The orientation of the mobile device may be determined by one or more instruments, as described above with respect to Step 222, located on the mobile device. For example, an azimuth graduation instrument may be used to measure an azimuth of the mobile device. In one or more embodiments of the invention, a particular computing device, as described, for example, in FIG. 4 below, is used to determine whether the mobile device is properly oriented. If the mobile device is properly oriented, then the process proceeds to Step 226. If the mobile device is not properly oriented, then the process proceeds to Step 232.

In Step 226, a determination is made as to whether the movement triggers the page skipping feature. For example, the movement required to trigger the page skipping feature may be associated with a particular movement (e.g., a sudden motion) in a particular direction (e.g., horizontally). Specifically, in one or more embodiments of the invention, the movement required to trigger the page skipping feature is based on an acceleration of the mobile device as measured by an accelerometer. Certain movements may also be excluded from triggering the page skipping feature. For example, merely tilting the mobile device may be recognized as failing to trigger the page skipping feature. In one or more embodiments of the invention, a particular computing device, as described, for example, in FIG. 4 below, is used to determine whether the movement triggers the page skipping feature. If the movement triggers the page skipping feature, then the process proceeds to Step 228. If the movement fails to trigger the page skipping feature, then the process proceeds to Step 232.

In Step 228, the number of pages displayed in the user application to skip is calculated based on the movement and the settings. In one or more embodiments of the invention, a magnitude of the movement, combined with the settings, is used to determine the number of pages of content displayed in the user application to skip. The magnitude of the movement may be measured by one or more instruments. Such instruments may include, but are not limited to, the instruments described above with respect to Step 222. The magnitude of the movement may correspond to the number of pages of content displayed in the user application to skip. For example, if the magnitude of the movement is large, then the number of pages of content displayed in the user application to skip may be large. Specifically, if the magnitude of a movement using an accelerometer is 20 on a scale of 20, then the number of pages of content displayed the user application to skip may be the maximum allowed, according to the settings.

In one or more embodiments of the invention, the movement also includes a direction used to determine whether pages displayed in the user application are skipped forward or backward. The direction of the movement may determine whether pages are skipped forward or backward based on the settings. For example, the settings may determine that a movement of the mobile device from left to right skips pages displayed in the user application backward (i.e., toward the beginning of the user application).

In one or more embodiments of the invention, the settings translate the movement into a number of pages of content in the user application to be skipped. Specifically, the settings may set parameters for each movement of the mobile device. For example, the settings may determine the maximum number of pages that may be skipped for a single movement. The settings may also determine whether a movement of the mobile device from right to left skips pages of the user application forward or backward. In one or more embodiments of the invention, a particular computing device, as described, for example, in FIG. 4 below, is used to calculate, based on the movement and the settings, the number of pages of the user application to skip.

In Step 230, a target page of the user application is presented based on skipping the number of pages from a current page displayed in the user application. The current page displayed in the user application may be the page displayed at the time the movement of the mobile device is detected. For example, if the current page displayed in the user application at the time the movement of the mobile device is detected is page 31, and if the number of pages of content displayed in the user application to skip is calculated to be 72 pages forward, then page 103 (i.e., the target page) of the content is presented on the mobile device. In one or more embodiments of the invention, a particular computing device, as described, for example, in FIG. 4 below, is used to present, based on skipping the number of pages from a current page of the user application, a target page of the user application. After completing Step 230, the process reverts to Step 222.

In Step 232, a determination is made as to whether execution of the user application is terminated. In one or more embodiments of the invention, the execution of the user application is terminated when the user application is no longer active on the mobile device. The user application may be terminated by the user (e.g., closing the user application, activating a different application) and/or by the occurrence of an event (e.g., the passage of time, the end of a subscription to the content). In one or more embodiments of the invention, a particular computing device, as described, for example, in FIG. 4 below, is used to determine whether the user application is exited. If the user application is not exited, then the process proceeds to Step 234. If the user application is exited, then the process ends.

In Step 234, a determination is made as to whether the page skipping feature is disabled. In one or more embodiments of the invention, the page skipping feature is disabled when any movement of the mobile device fails to trigger the page skipping feature. The page skipping feature may be disabled by the user and/or by the occurrence of an event (e.g., passage of time triggering a sleep timer based on the settings). In one or more embodiments of the invention, a particular computing device, as described, for example, in FIG. 4 below, is used to determine whether the page skipping feature is disabled. If the page skipping feature is not disabled, then the process reverts to Step 222. If the page skipping feature is disabled, then the process ends.

The following description (in conjunction with FIGS. 3A and 3H) describes an example in accordance with one or more embodiments of the invention. The example is for explanatory purposes only and is not intended to limit the scope of the invention. Terminology used in FIGS. 1 through 2B may be used in the example without further reference to FIGS. 1 through 2B.

EXAMPLE

Consider the following example, shown in FIGS. 3A through 3H, which describes skipping pages in a user application displayed on a mobile device in accordance with one or more embodiments described above. In the example, consider the scenario in which Mike Mohler (304) is a user (e.g., an individual reading an electronic book on a mobile device (306)). As shown in FIG. 3A, Mike Mohler (304) uses the mobile device (306) to access content from a content service (308). The content may have multiple pages, and so Mike Mohler (304) decides to use embodiments of the invention to more quickly navigate portions of the content. Mike Mohler (304) enters one or more settings for embodiments of the invention into the mobile device (306).

After receiving the settings, as shown in FIG. 3B, the content is shown on the mobile device (306) to Mike Mohler (304). Page 1 of the content is the current page shown on the mobile device (306). Further, information about the content is received by the mobile device (306). For example, the mobile device (306) may determine that the content starts on page 1 and that the content has a total of 176 pages. After page 1 of the content is displayed on the mobile device (306), Mike Mohler (304) wants to skip to page 105. To skip pages of the content, Mike Mohler (304) moves the device from the left side to the right side of the mobile device (306).

When the movement of the mobile device (306) is detected, the accelerometer module (320), found in embodiments of the invention, processes the movement. In this example, as shown in FIG. 3C, the accelerometer module (320) determines that, while the mobile device (306) was properly oriented during the movement, the movement itself did not trigger the page skipping feature because the direction of the movement was improper. In this case, the proper orientation is holding the mobile device (306) on the left and right side while the mobile device (306) lies in a plane that is within +/−70° of horizontal. Also, in this example, the movement of the mobile device (306) should be top to bottom or bottom to top to trigger the page skipping feature. Since the movement was side to side, the orientation module (320) determined that the movement was improper to trigger the page skipping feature. As a result, the accelerometer module (320) notifies the page skipping engine (324) that no pages of the content should be skipped. Consequently, the page skipping engine (324) maintains page 1 as the current page displayed on the mobile device.

As shown in FIG. 3D, Mike Mohler (304) causes a different movement of the mobile device (306) to trigger the page skipping feature. The mobile device (306) is displaying page 1 of the content. The movement of the mobile device (306) that Mike Mohler (304) creates is a forceful bottom to top movement. The movement is caused while Mike Mohler (304) holds the mobile device (306) by the sides as the mobile device (306) is positioned horizontally.

When the movement shown in FIG. 3D is complete, the process proceeds to FIG. 3E, where the accelerometer module (320) determines that the mobile device (306) was properly oriented during the movement and that the movement itself triggers the page skipping feature. Because the mobile device is properly oriented during the movement and the movement triggers the page skipping feature, the calculating module (322) calculates the number of pages to skip based on the movement. In this example, the calculating module (322) calculates that 157 pages should be skipped forward. The calculating module (322) notifies the page skipping engine (324) that 157 pages should be skipped forward. As a result, the page skipping engine (324) skips forward 157 pages in the content so that page 158 (i.e., the target page) of the content is displayed on the mobile device.

As shown in FIG. 3F, the mobile device (306) presents page 158 (now the current page) of the content to Mike Mohler (304). Because Mike Mohler (304) wants to view page 105 of the content, Mike Mohler (304) realizes that he has skipped too far forward. Consequently, Mike Mohler (304) causes a movement to the mobile device (306) to skip pages of the content backward. In this example, Mike Mohler (304) holds the mobile device (306) by the sides as the mobile device (306) is positioned 30° above horizontal. The movement is a slightly forceful top to bottom movement of the mobile device (306).

When the movement shown in FIG. 3F is complete, the process proceeds to FIG. 3G, where the accelerometer module (320) determines that the mobile device (306) was properly oriented during the movement and that the movement itself triggers the page skipping feature. Because the mobile device is properly oriented during the movement and the movement triggers the page skipping feature, the calculating module (322) calculates the number of pages to skip based on the movement. In this example, the calculating module (322) calculates that 50 pages should be skipped backward. The calculating module (322) notifies the page skipping engine (324) that 50 pages should be skipped backward. As a result, the page skipping engine (324) skips backward 50 pages in the content so that page 108 (the target page) of the content is displayed on the mobile device, as shown in FIG. 3H.

To navigate to page 105 of the content, Mike Mohler (304) may further use the page skipping feature by making a very slight top to bottom movement of the mobile device (306) while the mobile device (306) is properly oriented. Alternatively, Mike Mohler (304) may use a page turning feature on the mobile device (306) known in the art, where each page is turned individually.

Figure 4:
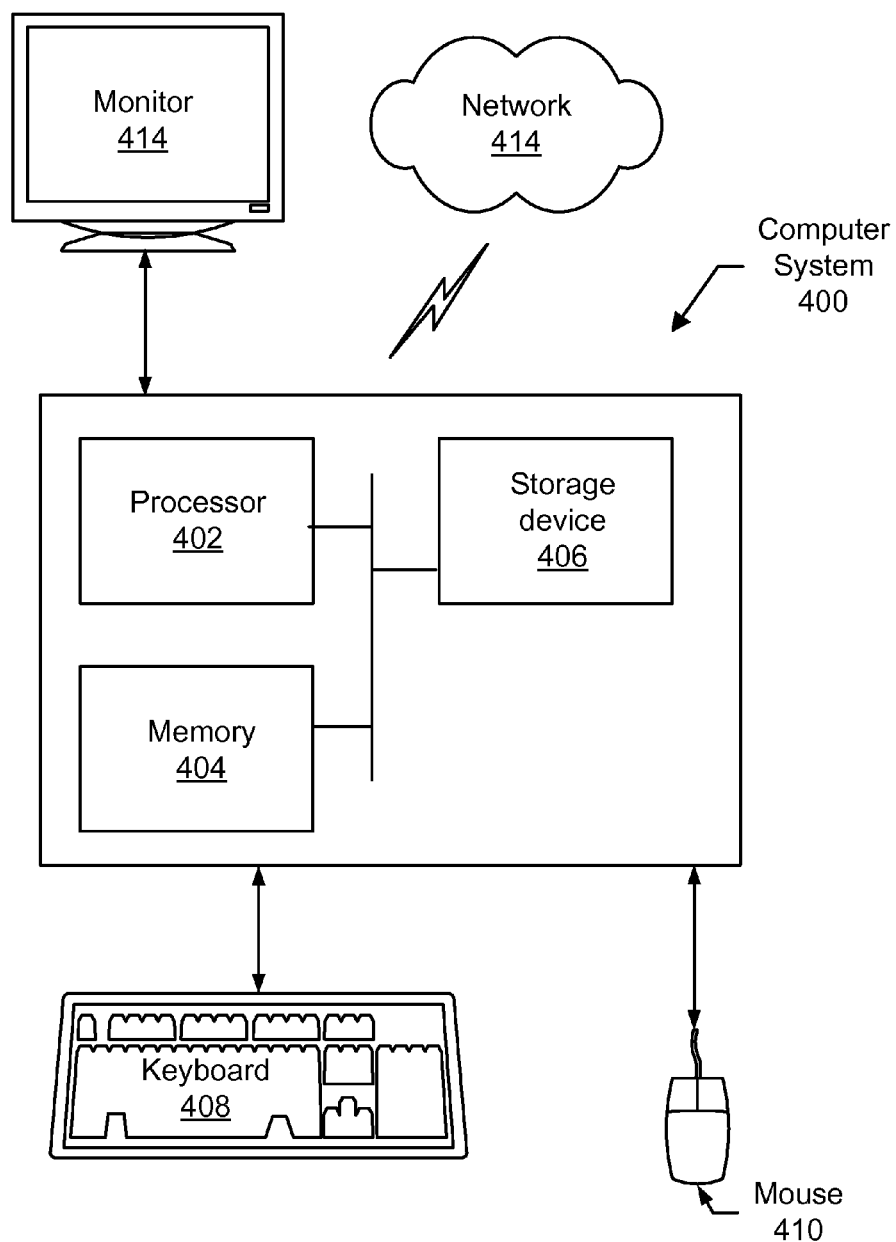
FIG. 4 shows a mobile device in accordance with one or more embodiments of the invention.

FIG. 4 shows a computer system (400) on which one or more embodiments of a system (e.g., the mobile device as described above with respect to FIG. 1) may be implemented. The computer system (400) of FIG. 4 may be virtually any type of computer regardless of the platform being used. For example, as shown in FIG. 4, the computer system (400) includes one or more processor(s) (402) such as an integrated circuit, a central processing unit (CPU), or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include optional input means, such as a keyboard (408), a mouse (410), or a microphone (not shown). Further, the computer system (400) may include output means, such as a graphical display (412) (e.g., a liquid crystal display (LCD), a light-emitting diode (LED) display, a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Many different types of computer systems exist, and the aforementioned input and output means may take other forms, now known or later developed. Generally speaking, the computer system (400) includes at least the minimal processing, input, and/or output means necessary to practice embodiments of the invention.

Further, one or more elements of the aforementioned computer system (400) may be located at a remote location and connected to the other elements over a network. Further, embodiments of the invention may be implemented on a distributed system having a plurality of nodes, where each portion of the invention (e.g., page-skipping engine, accelerometer module, calculating module) may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable storage medium such as a compact disc (CD), a diskette, a tape, or any other physical computer readable storage device.

One or more embodiments of the invention provide for skipping pages of content displayed by a user application on a mobile device. Specifically, embodiments of the invention allow a user to skip pages of content on a mobile device based on a movement of the mobile device. The process of navigating through pages of content on a mobile device typically involves turning individual pages on the mobile device, as by swiping a finger horizontally across the screen of the mobile device. Embodiments of the invention may reduce the amount of time spent by the user in navigating a number of pages of content on a mobile device.

In embodiments of the invention, a proper movement and orientation of the mobile device is required to enable the page skipping feature. As a result, pages displayed on the mobile device are not skipped due to inadvertent movements (e.g., bumping the mobile device, dropping the mobile device, tilting the mobile device). Further, embodiments of the invention may allow a user, by moving the mobile device in a particular way, to skip to the last page or first page of content displayed by the user application.

Embodiments of the invention may allow the user to customize settings so that certain movements and orientations, familiar to the user and how the user uses the mobile device, are used to trigger the page skipping feature. The settings may also be configured to allow a user to use different movements to skip to the last page and/or first page of content displayed by a user application on the mobile device. The settings may also be calibrated using embodiments of the invention, so that a particular movement and/or a particular acceleration may be used to set a minimum and/or maximum movement and/or acceleration to trigger the page skipping feature.

Embodiments of the invention may be used with one of a number of different applications. In one instance, a user application may be an electronic book viewer with multi-page support, where embodiments of the invention may be used to skip pages in an electronic book. In another instance, a user application may be an accounting or financial software application capable of displaying a number of entries (e.g., accounts, transactions), where embodiments of the invention maybe used to skip from one entry to another entry in the software application. In another instance, a user application may be a spreadsheet viewer displaying a number of tabs, where embodiments of the invention maybe used to skip tabs in a spreadsheet.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for skipping a plurality of pages displayed on a mobile device, the system comprising:
   a computer processor;
   an accelerometer module executing on the computer processor and configured to:
      determine, using a gyroscope, that the mobile device is oriented within +/−30° of horizontal;
      detect, using an accelerometer, a movement of the mobile device, wherein the movement comprises a magnitude;
      determine, using the accelerometer, that the mobile device is oriented for skipping the plurality of pages; and
      determine, using the accelerometer, that the movement triggers skipping the plurality of pages;
   a calculating module operatively connected to the accelerometer module and executing on the computer processor, the calculating module configured to:
      calculate, based on the magnitude of the movement, a total number of pages of content in a user application, and a plurality of settings, the plurality of pages to skip, wherein the plurality of settings require that the magnitude of the movement be directly and linearly proportional to the total number of pages in the user application; and
   a page-skipping engine operatively connected to the accelerometer module and executing on the computer processor, the page-skipping engine configured to:
      display, based on the plurality of pages calculated by the calculating module, a target page on the mobile device.

2. The system of claim 1, further comprising:
   a storage repository operatively connected to the page-skipping engine and configured to store the plurality of settings.

3. The system of claim 1, wherein the calculating module is further configured to:
   determine, based on a direction of the movement, that the plurality of pages to skip is forward relative to a current page displayed on the mobile device,
   wherein the movement further comprises the direction.

4. The system of claim 1, wherein the plurality of settings is created by a user of the mobile device.

5. The system of claim 1, wherein the page-skipping engine is further configured to:
   receive a plurality of information about a user application displayed on the mobile device,
   wherein the plurality of information comprises a number of pages of content in the user application and a current page displayed on the mobile device.

6. The system of claim 1, wherein the page-skipping engine is further configured to:
   determine that a user application displayed on the mobile device is configured to skip the plurality of pages; and
   enable, based on determining that the user application is configured to skip the plurality of pages, page skipping for the user application.

7. The system of claim 1, wherein the magnitude of the movement measures an acceleration of the mobile device, wherein calculating the plurality of pages to skip is based on the acceleration of the mobile device.

8. A method for skipping a plurality of pages displayed on a mobile device, the method comprising:
   detecting, using a computer processor, a movement of the mobile device displaying a current page, wherein the movement comprises a magnitude;
   determining, using the computer processor, that the mobile device is oriented within +/−30° of horizontal for skipping the plurality of pages;
   determining, using the computer processor and based on determining that the mobile device is oriented for skipping the plurality of pages, that the movement triggers page skipping on the mobile device;
   calculating, using the computer processor and based on determining that the movement triggers page skipping, the plurality of pages to skip based on the magnitude of the movement, a total number of pages of content in a user application, and a plurality of settings, wherein the plurality of settings require that the magnitude of the movement be directly and linearly proportional to the total number of pages in the user application; and displaying, using the computer processor and based on the plurality of pages to skip from the current page, a target page on the mobile device.

9. The method of claim 8, wherein the plurality of settings is received from a user.

10. The method of claim 8, further comprising:
determining, prior to detecting the movement of the mobile device, that a user application is configured to skip the plurality of pages.

11. The method of claim 8, wherein the movement comprises tilting the mobile device using a sudden motion.

12. The method of claim 11, wherein the sudden motion is measured as an acceleration of the mobile device, and wherein calculating the plurality of pages to skip is based on the acceleration.

13. The method of claim 12, wherein a direction of the movement is forward, wherein the plurality of pages to skip is forward relative to the current page displayed on the mobile device, and wherein the movement further comprises the direction.

14. A computer readable medium comprising computer readable program code embodied therein for performing a method for skipping a plurality of pages displayed on a mobile device, the method comprising:

detecting a movement of the mobile device displaying a current page, wherein the movement comprises a magnitude;

determining that the mobile device is oriented within +/−30° of horizontal for skipping the plurality of pages;

determining, based on determining that the mobile device is oriented for skipping the plurality of pages, that the movement triggers page skipping on the mobile device;

calculating, based on determining that the movement triggers page skipping, the plurality of pages to skip based on the magnitude of the movement, a total number of pages of content in a user application, and a plurality of settings, wherein the plurality of settings require that the magnitude of the movement be directly and linearly proportional to the total number of pages in the user application; and displaying, based on the plurality of pages to skip from the current page, a target page on the mobile device.

15. The computer readable medium of claim 14, further comprising:
determining, prior to detecting the movement of the mobile device, that a user application is configured to skip the plurality of pages.

\* \* \* \* \*